United States Patent [19]
Moore et al.

[11] Patent Number: 5,374,104
[45] Date of Patent: Dec. 20, 1994

[54] ARMREST WITH VIDEO DEPLOYMENT SYSTEM

[75] Inventors: Jimmy E. Moore; Tracy L. Kirk, both of Gainesville, Tex.

[73] Assignee: Weber Aircraft, Inc., Gainesville, Tex.

[21] Appl. No.: 887,370

[22] Filed: May 21, 1992

[51] Int. Cl.⁵ .............................................. A47C 7/62
[52] U.S. Cl. .............................. 297/188.16; 248/293; 248/286
[58] Field of Search ...................... 297/194, 188, 217; 248/118.5, 293, 920, 286; 358/254

[56] References Cited

U.S. PATENT DOCUMENTS

| | | |
|---|---|---|
| 4,866,515 | 9/1989 | Tagawa et al. |
| 4,896,209 | 1/1990 | Matsuzaki et al. |
| 4,897,714 | 1/1990 | Ichise et al. |
| 4,958,381 | 9/1990 | Toyoshima |
| 4,982,996 | 1/1991 | Vottero-Fin et al. |
| 5,000,511 | 3/1991 | Shichijo et al. |
| 5,076,524 | 12/1991 | Reh et al. ........................ 297/194 X |
| 5,177,616 | 1/1993 | Riday ............................... 297/217 X |
| 5,179,447 | 1/1993 | Lain ................................. 297/194 X |
| 5,195,709 | 3/1993 | Yasushi ............................ 297/194 X |

Primary Examiner—Laurie K. Cranmer
Attorney, Agent, or Firm—Crutsinger & Booth

[57] ABSTRACT

An armrest for an individual seat wherein the armrest has a deployment arm for extending a video device from inside the armrest to a viewing position and retracting the video device into the armrest for storage.

The video device is connected to a deployment arm. The video device and deployment arm are configured to retractably fit within the hollow interior of an armrest. The interior of the armrest has a track system including at least two tracks to which the deployment arm is slidingly engaged. The two tracks diverge from one another so that the spaced relation between the tracks varies along the track system. The deployment arm has at least two rollers that slidingly engage the track system. The diverging tracks urge the deployment arm to change orientation as the rollers slide along the track system, thereby urging the deployment arm to extend the video device from the armrest into a viewing position. To restore the video device to the stowed position, the video device or arm is pushed in the reverse direction, and in one simple, quick motion the video device may be stowed within the armrest.

24 Claims, 5 Drawing Sheets

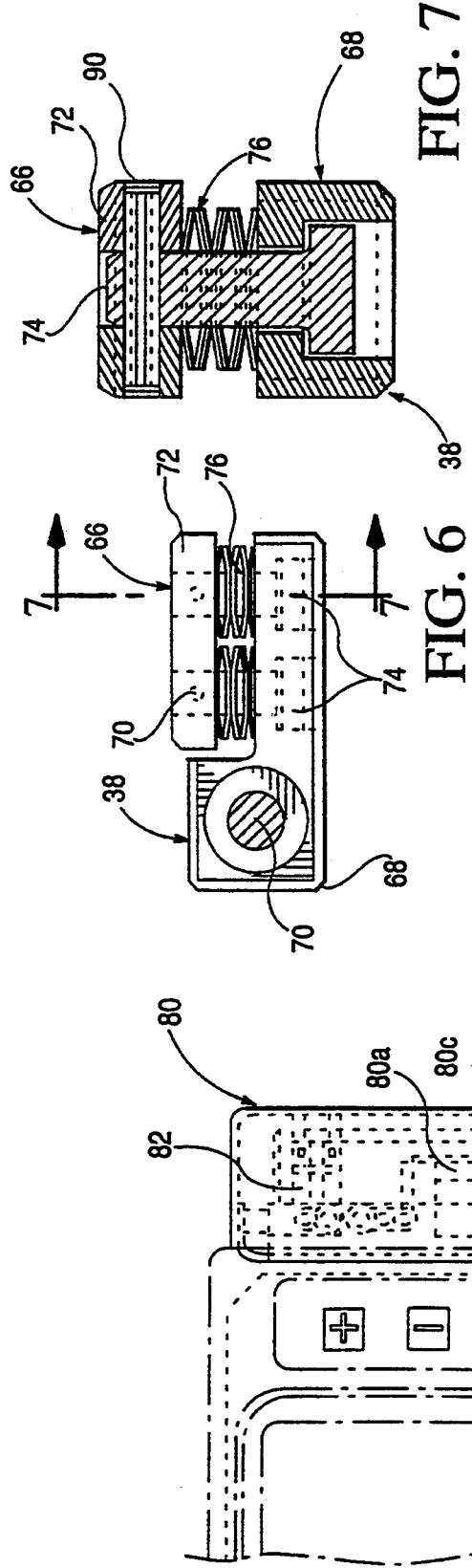
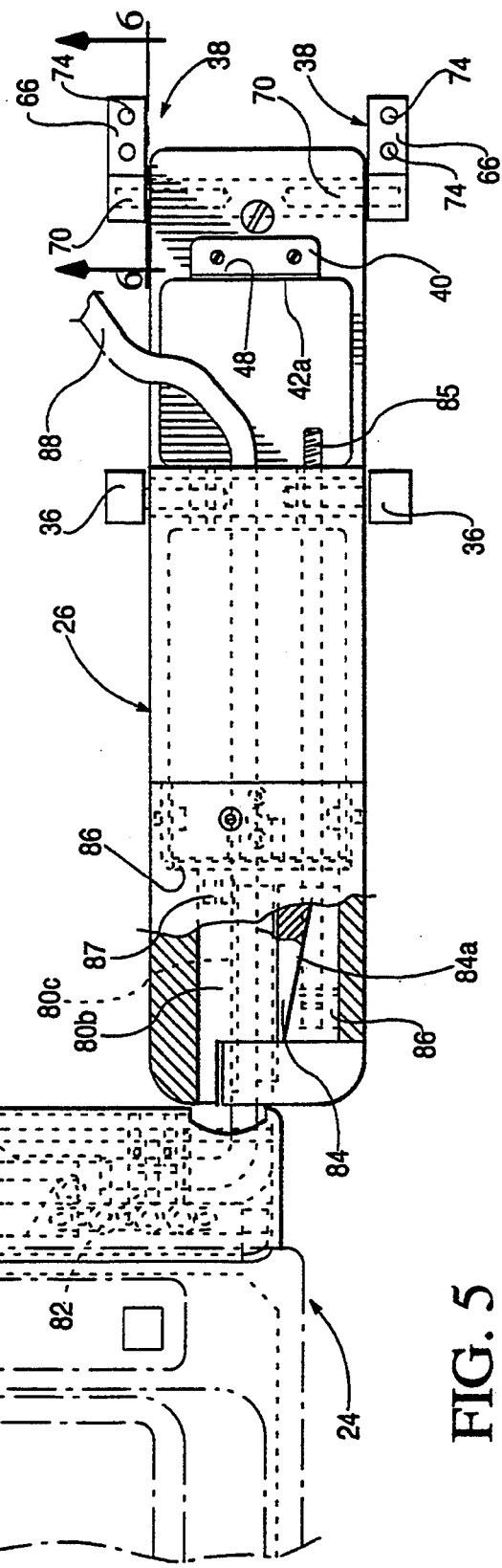

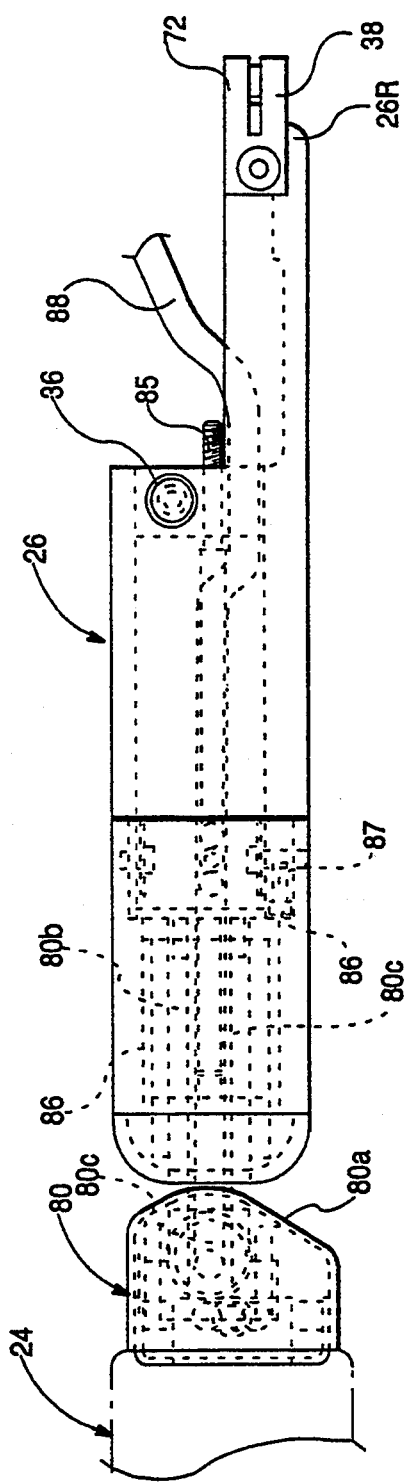
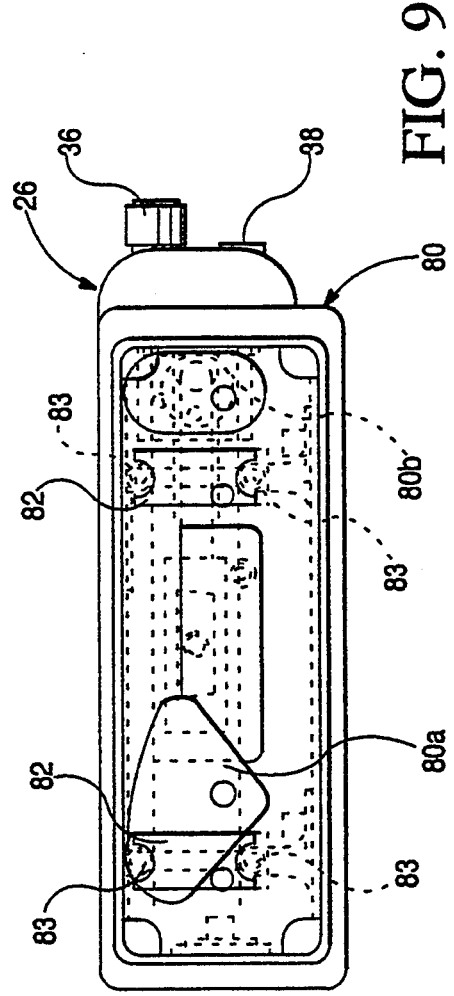
FIG. 8
FIG. 9

ARMREST WITH VIDEO DEPLOYMENT SYSTEM

TECHNICAL FIELD

The invention relates to an armrest for a chair, seat, or the like. The armrest has a video device and a video support arm that are stowed inside the armrest. The video device and support arm may be extended to a viewing position or retracted to a stowed position inside the armrest.

BACKGROUND OF THE INVENTION

The field of individual seat video monitors is relatively new in the airline industry. Individual seat video monitors may also be used in the passenger seats of vans or other vehicles.

The prior art armrests having video deployment systems are awkward and difficult to operate. The prior art systems use complicated tensioning mechanisms to maintain the video device and deployment arm in a viewing position. The deployment arms of these systems must be manually un-folded or twisted to extend the video device to the viewing position.

The problems associated with the prior art systems for use in the airline industry are further complicated by Federal Aviation Authority ("FAA") safety regulations. In particular, the FAA requires a "breakover" feature so that the video deployment system can be quickly and easily moved out of the way. In an emergency situation, the video device and deployment arm must be quickly movable so that they do not block an area in front of the passenger seat and do not inhibit egress from the seat.

Furthermore, the electrical wiring to the video device in the prior art deployment systems is subject to wear and damage. The wiring to the video device is usually routed along the length of the deployment arm and tensioning mechanism. Therefore, the wiring follows the motions of the deployment arm. The complicated unfolding and twisting motions of the prior art deployment arms may be over 200 degrees. After a few deployments, these extreme motions may cause severe damage to the electrical wiring, creating a safety hazard and requiring frequent inspection and maintenance.

Furthermore, the prior art apparatuses often leave an unsightly opening in the armrest when deployed in a viewing position. Some passengers may be tempted to place materials in the armrest through the opening, which would interfere with stowing the video device and deployment arm. Other prior art designs utilize a hinged cocktail and armcap member to cover the deployment mechanism and opening, however, these require additional maintenance and create other problems with the structure of the armrest.

SUMMARY OF THE INVENTION

The armrest of the invention is for retractably supporting a video device such that the video device may be extended to a viewing position and retracted into the armrest for storage. The armrest has a body structure with a hollow interior and an unobstructed opening. The video device is connected to a deployment arm. The video device and deployment arm are configured to retractably fit through the opening and within the hollow interior of the body of the armrest.

The interior of the body structure of the armrest has a track system. The track system comprises at least two spaced apart tracks. At one portion of the track system, the two tracks are relatively close to one another and may be substantially parallel. At another portion of the track system, the two tracks diverge so that they are relatively spaced apart from one another. Thereby, the spaced relation between the two tracks of the track system varies along the track system.

The deployment arm has at least two sliding members such as rollers or sliding pegs that engage the track system. These sliding members are spaced apart in fixed relation to one another.

The track system guides the movement of the deployment arm. As the deployment arm is moved along the track system, the changing space relation of the two tracks urges the sliding members of the deployment arm to change orientation, thereby urging the deployment arm to similarly move and turn. This sliding and turning action of the deployment arm is employed to extend the video device from the armrest into a viewing position and then retract the video device into a stowed position within the armrest.

For example, the deployment arm may be oriented substantially horizontally within the armrest along the track system. The video device is toward the front of the armrest. To deploy the video device, it is pulled forward, and as the deployment arm slides along the diverging track system, the arm is urged to turn so that the video device is moved forward and upward into a viewing position. When fully deployed, the arm may be locked into position with a latch or more preferably, by sliding the arm past a "breakover" position. To restore the video device to the stowed position, the video device or arm is pushed in the reverse direction, past the breakover position, and in one, simple, quick motion, the video device may be stowed within the armrest.

The invention provides an armrest for an individual seat wherein the armrest has a deployment arm for extending a video device from inside the armrest to a viewing position. The individual seat may be a passenger seat designed for use in public, military, or private transportation. The armrest with video deployment system operates in a safe, simple, and reliable manner. The armrest of the invention involves a minimum amount of mechanical motion and a minimum effort by the passenger for deployment or stowing of the video device.

BRIEF DESCRIPTION OF THE DRAWINGS

Drawings of a preferred embodiment of the invention are annexed hereto so that the invention may be better and more fully understood, in which:

FIG. 5 is a fragmentary top plan view of the deployment arm and video monitor;

FIG. 6 is a cross-sectional view taken along line 6—6 of FIG. 5;

FIG. 7 is a cross-sectional view taken along line 7—7 of FIG. 6;

FIG. 8 is a side elevational view of the deployment arm; and

FIG. 9 is an end view of the deployment arm.

Numeral references are employed to designate like parts throughout the various figures of the drawing.

DETAILED DESCRIPTION OF A PREFERRED EMBODIMENT

Figure 1:
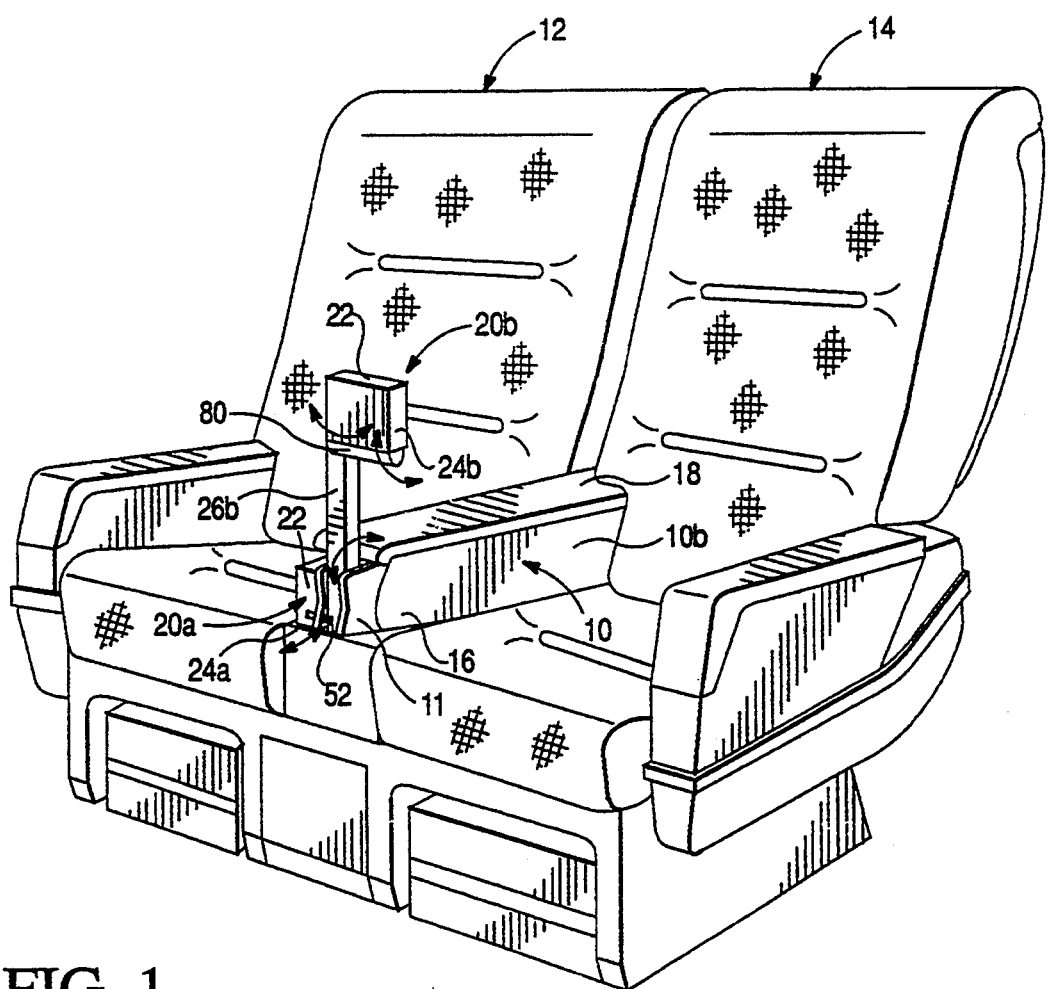
FIG. 1 is a perspective view of a pair of adjacent airline seats having a dual armrest with the video deployment system mounted therein.

Referring to FIG. 1 of the drawing, the numeral 10 generally designates a dual armrest between two adjacent seats 12 and 14 in a typical double aircraft seat. In the particular embodiment illustrated in FIG. 1, the dual armrest 10 includes two individual video deployment systems 20a and 20b, one for each seat. Each video deployment system 20 is preferably modular in construction such that one system may be employed in a single armrest or such that two systems may be employed in the dual armrest as illustrated in FIG. 1. Video deployment systems 20a and 20b are of identical construction, except that hinge assemblies 80 are mounted to permit the monitor 24a provided for seat 12 to rotate in a counterclockwise direction and monitor 24b provided for seat 14 to rotate in a clockwise direction when moved from a stowed position to a viewing position.

Each video deployment system 20 includes a video device 24, a deployment arm 26, and a track system 28.

As illustrated in FIG. 1, the armrest 10 has a body 16 formed and positioned to comfortably support the arm of a seated passenger. The body 16, which could include a cocktail tray, may be formed of any suitable structural material, such as metal or molded plastic. Preferably the body 16 of the armrest 10 has an armpad 18 to comfortably support the elbow of a seated passenger.

The body 16 of the armrest 10 has a hollow interior between spaced side panels 10b. Partition walls may divide the interior to form two or more interior cells. As will be hereinafter more fully explained, the video deployment system 20 is contained completely within the interior of the armrest 10 when it is in the stowed position. The video device and deployment arm may be extended through an opening in the body 16 of the armrest 10.

In the illustrated embodiment, the opening, covered by escutcheon front frame 11, is located in the forward end of the armrest 10. The video deployment system 20a adjacent seat 12, is illustrated in the stowed position. In the stowed position the opening in armrest 10 is closed or covered by the exposed top surface 22 of the video device 24a. The video deployment system 20b adjacent seat 14 is illustrated in the viewing position. It will be noted that the opening in the armrest 10 is closed or covered by deployment arm 26b which supports monitor 24b, as will be hereinafter more fully explained.

The video device 24 is a commercially available liquid crystal diode (LCD) monitor and forms no part of the invention except in combination with the deployment system 20. An LCD type monitor is particularly suitable for this invention because of its slim profile design that fits easily within the space of a hollow armrest 10. As will be hereinafter more fully explained, the video device 24 is pivotally attached to the deployment arm 26 so a seated passenger may adjust the viewing position as desired. The monitor may be rotated about generally vertical and horizontal axes and arm 26 is rotatable about a generally horizontal axis.

The terms "horizontal, vertical, upper, lower, front and rear" are used only to describe the particular embodiment of the invention oriented as illustrated in the drawings. The terms are used merely as a convenience and are not intended to be limiting in any way or to imply that the deployment system must be oriented precisely as illustrated.

Further, the deployment system is described and illustrated as a mounting for a video monitor 24. However, it is contemplated that the deployment system may be used for mounting other and further devices, such as telephones, computer terminals, book holders and the like.

As will be hereinafter more fully explained, the deployment arm 26 is preferably a rigid member configured to support video monitor 24.

Figures 2, 3:
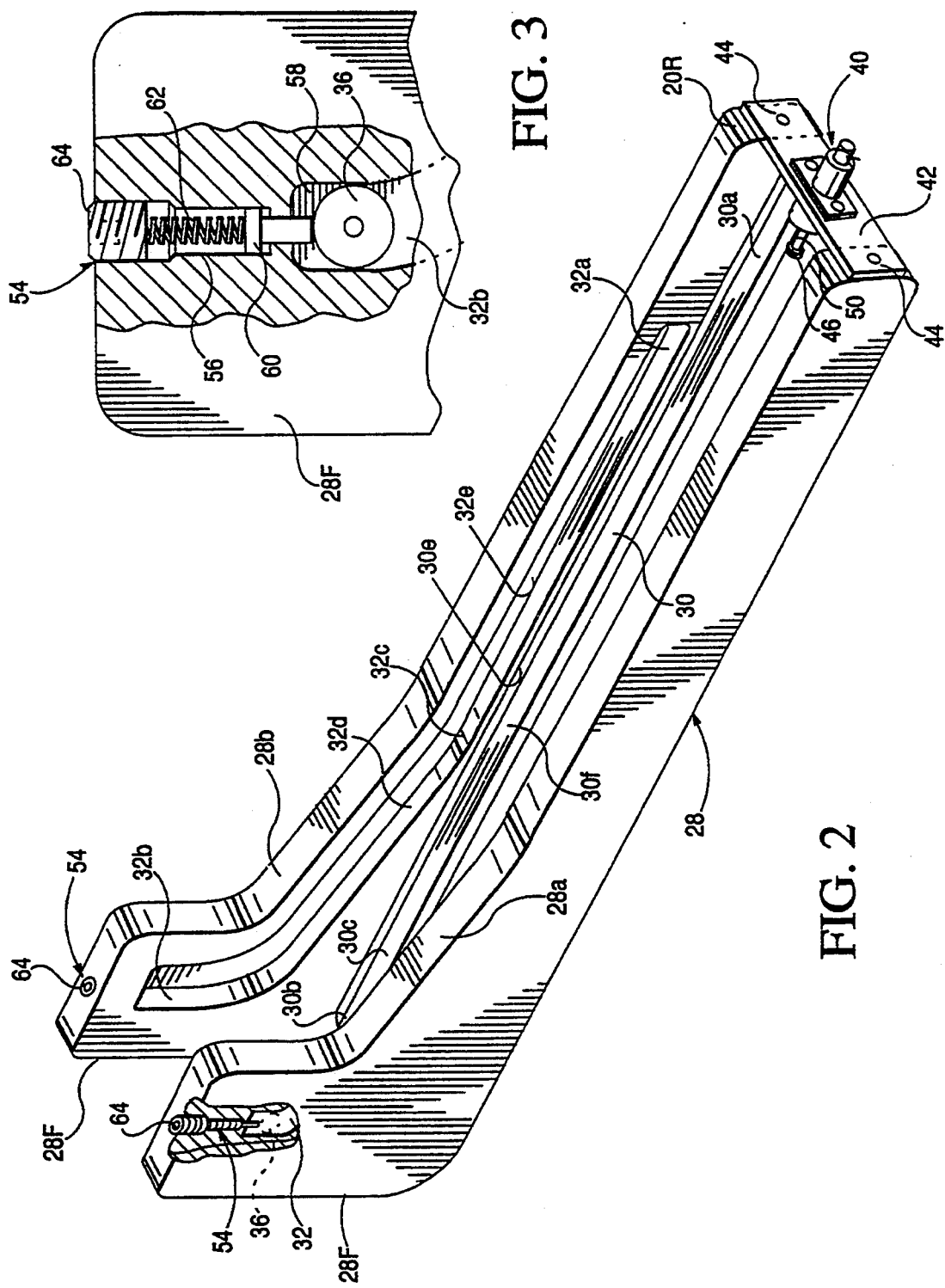
FIG. 2 illustrates the track system of a preferred embodiment of the invention.
FIG. 3 is an enlarged cross-section view of the breakover set screw assembly.

As best illustrated in FIGS. 2 and 3 of the drawings, in the preferred embodiment, the track system 28 is formed by a pair of left-hand and right-hand rails 28a and 28b, having symmetrical sets of guide grooves 30 and cam grooves 32 formed therein. The lower pair of guide grooves 30 and the upper pair of cam grooves 32 function as guide tracks which control the direction of movement of the deployment arm 26 and monitor 24.

The lower pair of guide grooves 30 are substantially straight in the illustrated embodiment and extend substantially the length of the track system 28. The inner ends 30a of lower guide grooves 30 in rails 28a and 28b are formed adjacent the rear end 20R of the side rails while the outer ends 30b of the guide grooves are formed adjacent the front end 20F of the rails. The upper pair of cam grooves 32 have inner ends 32a and outer ends 32b formed adjacent opposite ends of rails 28a and 28b. The upper cam grooves 32 are deflected as indicated at 32c such that the outer portions 32d of cam grooves 32 begin to diverge from outer portions of lower guide grooves 30. The rear portions 32e of upper cam grooves 32 are substantially parallel to the lower guide grooves 30. The distance between inner ends 30a and 32a equals the distance between points 30b and 32b.

Referring to FIGS. 5 and 6, the deployment arm 26 has a pair of follower rollers 36 mounted between opposite end thereof which move through cam grooves 32. A pair of slide members 38 are pivotally secured to the inner end 26R of deployment arm 26 and sliding along the guide grooves 30 of the track system 28.

The deployment arm 26 is mounted to slide between rails 28a and 28b and is supported by follower rollers 36 and slide members 38 which move through the symmetrical pairs of guide grooves 30 and cam grooves 32 in the track system 28. The lower pair of slide members 38 and the upper pair of follower rollers 36 are mounted in fixed relationship to one another on the deployment arm 26. The distance between the lower pair of slide members 38 and the upper pair of rollers 36, measured transversely of deployment arm 26, is substantially the same as the distance between the inner ends 30a and 32a of guide grooves 30 and cam grooves 32, respectively. The distance between the lower pair of slide members 38 and the upper pair of rollers 36, measured longitudinally of deployment arm 26, is substantially the same as the distance between the outer ends 30b and 32b of guide groove 30 and cam groove 32, respectively.

The follower rollers 36 and slide members 38 on the deployment arm 26 are captured between the symmetrical pairs of guide grooves 30 and cam grooves 32. The movement of the deployment arm 26 is determined by the respective paths followed by the follower rollers 36 and slide members 38 along the track system 28.

Figure 4:
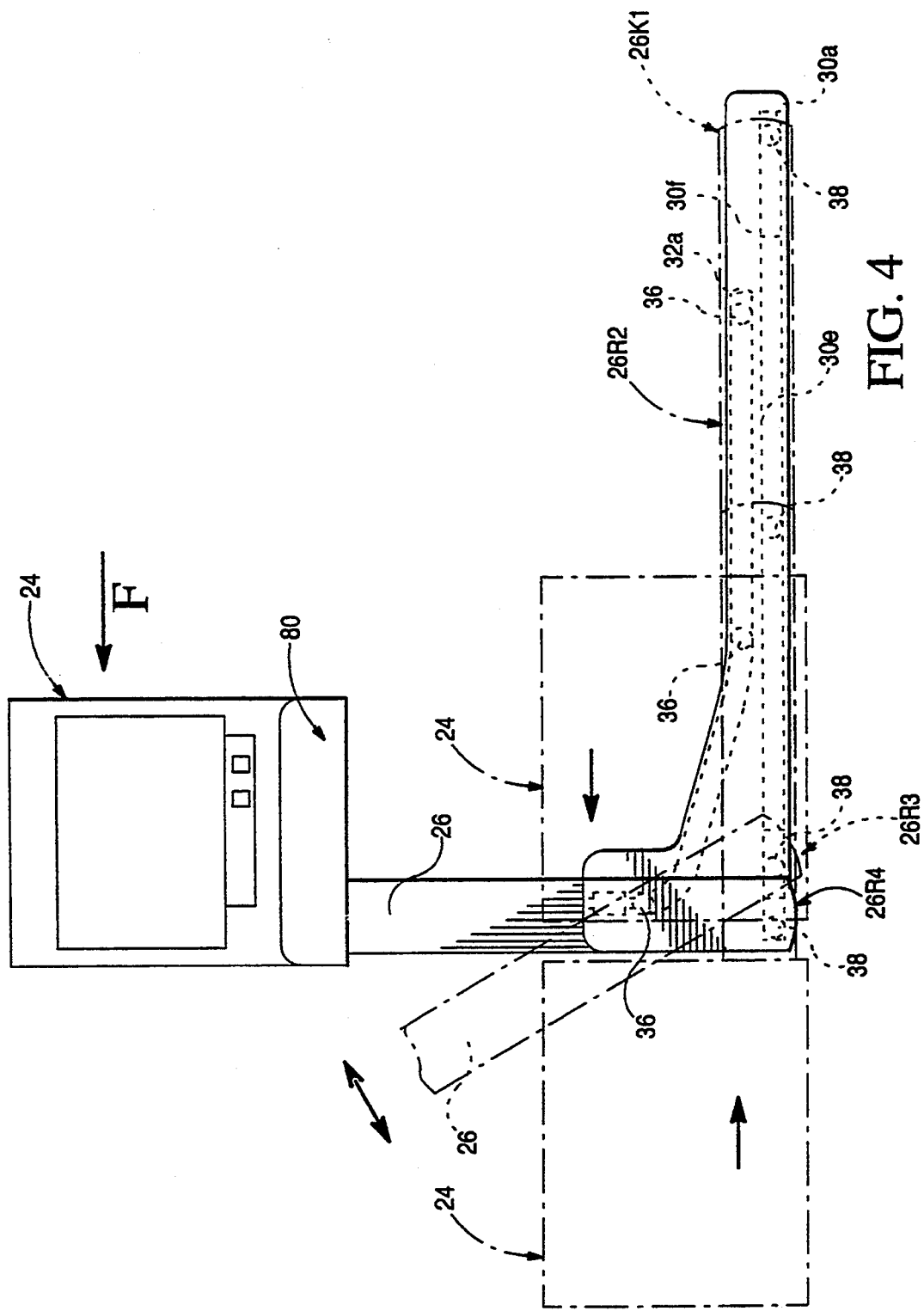
FIG. 4 shows the video device and deployment arm in several representative positions as the deployment arm moves along the track system between the stowed position and a viewing position.

The motion of the deployment arm 26 is best illustrated in FIG. 4, which shows the video device 24 and deployment arm 26 in phantom lines in the stowed position and at two representative positions between the stowed position and moving toward a viewing position. The video device 24 and deployment arm 26 are illustrated in full outline in a viewing position. For convenience of description, it is assumed that the video device 24 and the deployment arm 26 begin in the stowed position and the follower rollers 36 and slide members 38 are located in the cam grooves 30 and guide grooves 30, respectively, at points 32a and 30a, respectively. In the stowed position, the points 30a and 32a substantially coincide with the axes about which follower rollers 36 and slide members 38 rotate. At this point the deployment arm 26 is supported generally parallel to the guide track 30. However, as follower rollers 36 move past point 32c into the outer portion 32d of cam groove 30, follower roller 36 begins to move away from guide groove 30 which elevates the outer end of deployment arm 26 and the video monitor 24 secured thereto.

As best illustrated in FIGS. 2 and 5, a spring-assist latch assembly 40 is mounted between side rails 28a and 28b to restrain the video device 24 and deployment arm 26 in the stowed position. The spring-assist latch assembly 40 is commercially available and includes a locking cam 46 mounted on a stem to rotate 90 degrees to pass through an oblong opening 42a in a keeper 42 secured to the rear end of deployment arm 26. The locking cam 46 rotates and engages a lip 48 on the keeper 42 when the deployment arm 26 is pushed against the spring-assist latch assembly 40 toward the stowed position. When the cam 46 engages the lip 48, a spring 50 is mechanically compressed and restrained in position, thereby storing some of the kinetic energy involved in stowing the video device 24 and deployment arm 26. This energy stored in the spring 50 is released when the video device 24 is pressed at exposed surface 22 (illustrated in FIG. 1), which operates in a manner similar to a push-button release latch. The pushing motion rotates the cam 46, disengaging it from the lip 48 on the keeper 42 secured to the deployment arm 26, and the spring 50 is allowed to release its stored energy, which urges the deployment arm 26 to make an initial forward movement along the path defined by the cam grooves 30 and guide grooves 32. The spring-assist latch assembly 40 thereby moves at least a portion of the video device 24 out of the stowed position in the armrest 10, which provides the seated passenger an easy grasp of the video device 24 to further deploy the video device 24 and deployment arm 26 into a desired viewing position.

The spring-assist latch assembly 40 may not be sufficient to restrain the video device 24 in the stowed position in the event of a sudden acceleration or deceleration, such as might be experienced in an emergency situation. When the video device 24 is not in use, the video device 24 should be securely locked to prevent it from moving relative to the armrest in the case of an accident or sudden stopping motion, which might interfere with egress from the seat.

A lever latch 52, illustrated in FIG. 1, is a suitable push-to-release locking mechanism which will withstand forces of at least 16 times the force of gravity.

After spring-assist latch assembly 40 initially moves the video device 24 forward about an inch, the passenger grasps the exposed portion of the video device 24 and pulls the video device 24 and deployment arm 26 out to the desired viewing position.

As the video device 24 and deployment arm 26 move forward, the deployment arm 26 remains substantially parallel to the lower guide grooves 30 until the follower rollers 32, moving in rear portions of cam grooves 32 reach point 32c. At this point, cam grooves 32 angle away from guide grooves 30. As the upper pair of follower rollers 36 continue to follow the diverging cam grooves 32, a rotational force is induced in the deployment arm 26 causing the end of the arm with the video device 24 to rise upward.

When the upper pair of rollers 36 in cam grooves 32 reach point 32b, they contact spring-plunger assemblies 54 located at the end of track grooves 32 adjacent to point 32b. At the same time the lower pair of slide members 38 approach and pass through point 30c. The spacing between the points 32b and 30c is such that the upper rollers 36 act against the spring-plunger assemblies 54 as the lower rollers 34 pass through point 30c.

As best illustrated in FIGS. 2 and 3, spring loaded plunger assemblies 54 are positioned in the outer ends 28F of rails 28a and 28b of the track system 28. The bore 56 of the assembly 54 has a section with a relatively small diameter that opens to the outer end 32b of cam groove 32. A plunger 58 having a shoulder 60 is slidably positioned through the lower end of the bore 56. The shoulder 60 on the plunger has a diameter greater than the small diameter section of the bore 56 such that the shoulder 60 prevents the plunger 58 from falling through the bore 56. The middle section of the bore 56 has a larger diameter to accommodate the shoulder 60. A spring 62 is positioned inside the middle section of the bore 56 above the plunger 56 to urge the shoulder 60 toward an extended position. The top section of the bore 56 is threaded and a correspondingly threaded set screw 64 is positioned therein. The set screw 64 has a slot 66 so that a screwdriver may be used to rotate the set screw, compressing the spring 62. The position of the set screw 64 is used to adjust the compression of the spring 62.

As the upper pair of follower rollers 36 contact spring-plunger assemblies 54 adjacent to the outer ends 32b of cam grooves 32 and the lower pair of slide members 34 approach points 30c in guide grooves 30 directly below the outer ends 32b of cam groove 32, the spacing between the points 32b and 30c is such that the upper follower rollers 36 begin to act against the plungers 58 of spring-plunger assemblies 54. The set screw 64 is adjusted so that a predetermined amount of force is required to displace the plungers 58 so that the deployment arm 26 may be moved along the track system 28 through point 30c. The amount of force required is determined by the downward force of the spring 62. The amount of force required to overcome the spring 62 is referred to as the "breakover" force required to move slide member 38 passed point 30c. Once the lower pair of slide members 38 pass "over center" through point 30c on guide grooves 30, the spacing between guide grooves 30 and ends 32b of cam grooves 32 is such that the force exerted by the upper follower rollers 36 against the plunger 58 is reduced, the spring 62 urges the plunger 58 to return toward its undisplaced position, and the arm 26 having moved "over center" moves to the end 30b of guide groove 30.

The spring-plunger assemblies 54 operate in the same manner when the deployment arm 26 is moved in the reverse direction, from a viewing position toward the stowed position. The breakover force must be overcome to move the lower pair of slide members 38 through point 30c of the track system. This breakover feature restrains the deployment arm 26 in the deployed position, however, the breakover feature is not a rigid lock. The video device 24 and the deployment arm 26 can be moved toward the stowed position and out of the path of egress from the seat with one, simple motion. A sufficient force F applied to the video device 24 can breakover the video device 24 and deployment arm 26 toward the stowed position.

This almost automatic return toward the stowed position is particularly important in aviation applications because the Federal Aviation Administration has promulgated regulations and requirements concerning breakover. When a sudden forward force is applied to the video device 24, the arm 26 must be capable of breaking-over out of the way so that the passenger may egress from the seat. The breakover for this preferred embodiment of the video deployment system of the invention is in the natural, designed path of operation.

As best illustrated in FIGS. 5, 6 and 7 slide members 38 preferably comprise friction members 66 that engage the lower pair of track grooves 30 and exert a predetermined friction forces against the guide grooves 30 such that the motion of the deployment arm 26 along the track system 28 is controlled rather than freely sliding. Preferably, at least in the portion of the track system near the viewing positions for the video device, the video device 24 and deployment arm 26 do not move freely on the track system 28. The friction members 66 provide stability to the motion of the deployment arm 26, which is a safety feature. Thereby, the friction members allow the video device 24 and deployment arm 26 to be positioned at any desired viewing position.

The slide members 38 preferably comprise a pair of friction members 66, each of which comprises a body 68 that is pivotally secured to the deployment arm 26, such as with a bolt 70 having a hexagonal socket in the head portion thereof to adjust the frictional force between the head of the bolt and the body 68. The body 68 has two counterbored holes through which pins extend. Spring washers 76 are mounted on the two pins, and the pins are slidingly inserted into bored holes in the friction block 72. A portion of each pin 74 is retained within the friction block 72 against the force of the compressed spring washers 76 by roll pins 90 that engage bored holes in the friction block 72 and the pins 74. The spring mounted friction block 72 frictionally engages the upper surface 30e of guide track groove 30 and the body 68 frictionally engages the lower surface 30f to provide a predetermined amount of resistance to movement of the deployment arm 26 along the track system. The guide grooves 30 may be slightly wider adjacent the inner ends 30a than at the outer ends 30b so that the resistance is reduced after the deployment arm 26 passes a point adjacent point 32c in cam groove 32.

As hereinbefore described and as illustrated in FIGS. 5, 8 and 9 of the drawing, the video device 24 is pivotally mounted to the deployment arm 26. An "L" shaped hinge assembly 80 having shaft legs 80a and 80b provides pivoting about two axes, one pivot axis for each leg portion of the hinge assembly 80. Each leg 80a and 80b has a groove 80c through which a video cable and power lines extend to the monitor.

The video device 24 is mounted to a clamp device 82 of nylon material. The clamp 82 formed by a pair of split nylon bushings has a pair of bolts 83 for adjusting the friction resistance to rotation of the nylon bushing about the shaft leg 80a. The resistance of the clamp system allows the video device 24 to be positioned as desired and retrained in the desired position about the shaft 80a.

Similarly, the shaft leg 80b is mounted in a split bushing clamp device 84 of nylon material that is part of the deployment arm 26. The clamp 84 has a bolt 85 for drawing a wedge member 86 relative to an inclined surface 84a on one half of the split bushing for adjusting the frictional resistance to rotation of the leg 80a in the nylon bushing.

The resistance of the clamp system allows the video device 24 to be positioned as desired and retrained in the desired position about the shaft leg 80b. A camplate 86a engages a pin 87 to limit the range of rotation of leg 80b to prevent excessive twisting of video antenna cable 88 and power lines.

Another feature of the preferred embodiment of the invention is that the opening in the armrest is covered by the video device 24 or the arm 26, which is cosmetically pleasing and prevents movement of foreign objects through the opening which could obstruct movement of the deployment arm. As illustrated in FIG. 1, in the stowed position, the top surface 22 of the video device 24 fills the opening and in the deployed position, the arm 26 fills the opening. Also with deployment through the front the armrest, the body 16 and armpad 18 are solid, one-piece designs.

The design of the video deployment system allows modular installation in an armrest for ease of replacement. Installation may be single units or dual units as illustrated in FIG. 1.

Finally, the design of the track system 28 allows the video deployment system to be adapted to automation such as by electrical actuation.

It is to be understood that numerous variations and modifications to the preferred embodiment of the invention can be made by those skilled in the art without departing from the scope and spirit of the invention as defined by the appended claims.

Having described the invention, we claim:

1. A video deployment system for mounting within the hollow interior of an armrest, said video deployment system comprising:
   (a) video means for displaying video images;
   (b) an arm for supporting said video means;
   (c) at least two sliding means attached to said arm, said sliding means being spaced apart longitudinally of said arm;
   (d) a track system having at least two guide means for supporting said sliding means, the distance between said two guide means being varied such that at one end of the track system to two guide means are spaced a distance substantially equal to the distance between said sliding means, and such that at the other end of said track system the two guide means are juxtaposed and generally parallel, said two sliding means engaging said two guide means whereby the orientation of said arm changes as said two sliding means move between the two ends of said track system so that toward one end of said track system said video means is in a viewing position and at the other end of said track system said video means is in a stowed position.

2. The video deployment system of claim 1 wherein said track system further comprises: spring-plunger means for exerting pressure on at least one of said two sliding means as said arm moves through a breakover point toward a stowed position whereby the pressure creates resistance to movement that tends to restrain said video means and said arm in the viewing position but which may be overcome by a sufficient force to return said video means and said arm toward the stowed position.

3. The video deployment system of claim 1 further comprising: a lock means for locking said video means in the stowed position whereby the video means cannot come loose during an accident or stopping motion of the vehicle.

4. The video deployment system of claim 1 wherein said track system further comprises: a spring-latch means that when engaged retains said arm in a stowed position and that when disengaged urges said video means and said arm to move at least partially toward a viewing position.

5. The video deployment system of claim 4 further comprising: a lock means for locking said video means in the stowed position whereby said video means cannot come loose during an accident or stopping motion of the vehicle.

6. The video deployment system of claim 1 wherein said arm has a longitudinal axis and said video means is pivotally mounted to said arm such that the viewing position of said video means may be adjusted by rotating said video means about said longitudinal axis of said arm and about a second axis generally perpendicular to said longitudinal axis.

7. The video deployment system of claim 1 further comprising: means for actuating the movement of said arm between the stowed position and a viewing position.

8. An armrest for retractably supporting a video device such that the video device may be extended to a viewing position and retracted into the armrest for storage, the armrest comprising: a body having a hollow interior and an opening; a deployment arm; a video device connected to said deployment arm, said video device and said deployment arm being configured to retractably fit through the opening and within the hollow interior of said body; at least two spaced apart follower members connected to said deployment arm, a track system in said arm, said track system for guiding and supporting the movement of said deployment arm, said track system having a cam surface and a guide surface extending generally longitudinally of said track system, said cam surface and said guide surface being relatively near to one another at one section of said track system and being relatively spaced apart from one another transversely of said track system at another section of said track system so that the spacing of said follower members and the different spacing between the sections of said track system urges the deployment arm to change orientation as it is moved on said track system between the extended viewing position and the retracted storage position.

9. The armrest of claim 8 wherein said two follower members comprise: a symmetrical set of two pairs of rollers.

10. The armrest of claim 8 wherein said armrest has a forward end and said opening in said body is at the forward end of the armrest.

11. The armrest of claim 8 wherein said video device is connected to said deployment arm by a pivot means so that the position of the video device may be adjusted.

12. The armrest of claim 8 wherein said guide surface is generally straight and at least a portion of said cam surface is curved.

13. The armrest of claim 8 wherein a surface of said deployment arm substantially closes the opening in said body when said video device and deployment arm are in a viewing position.

14. The armrest of claim 8 wherein a surface of said video device substantially closes the opening in said body when said video device and deployment arm are in the retracted storage position.

15. The armrest of claim 8 wherein a latch means retains said video device and said deployment arm in the storage position.

16. The armrest of claim 8 wherein one of said follower members is a means for applying fiction resistance to sliding movement at least when the deployment arm is extended toward the fully extended viewing position, thereby stabilizing the video device and deployment arm in any desired viewing position.

17. The armrest of claim 8 further comprising a spring-plunger means for creating a breakover position beyond which said deployment arm and video device are restrained in a viewing position, but which breakover position yields to a substantial force to move said video device and said deployment arm toward the stowed position.

18. A deployment system mounted on a vehicle seat having an arm comprising:
   a track system secured relative to the arm of the seat;
   a deployment arm; and
   a connector movably securing the deployment arm to the track system, said connector and said track system being configured to rotate said deployment arm from a generally horizontally extending position to a generally vertically extending position upon movement of said deployment arm longitudinally of said track system.

19. The deployment system of claim 18, said track system comprising: track means; guide means on said track means; and said connector comprising: follower means movable relative to said guide means.

20. The deployment system of claim 19, with addition of a hinge assembly having a first leg movably secured to said deployment arm permitting movement of said hinge assembly about a first axis extending generally longitudinally of said deployment arm and having a second leg secured to said first leg.

21. A video deployment system for mounting within the hollow interior of an armrest, said video deployment system comprising:
   (a) a video monitor for displaying video images;
   (b) an arm for supporting said video monitor;
   (c) at least two sliding members attached to said arm, said sliding members being spaced apart longitudinally of said arm; and
   (d) a track system having opposite ends, said track system having at least two guide surfaces spaced apart transversely of said arm for supporting said sliding members, the distance between said two guide surfaces being varied such that at one end of the track system the two guide surfaces are spaced apart a distance substantially equal to the distance between said sliding members, and such that at the other end of said track system the two guide surfaces are juxtaposed and generally parallel, said two sliding members engaging said two guide surfaces whereby the orientation of said arm changes as said two sliding members move between the two ends of said track system so that toward one end of said track system said video monitor is in a viewing position and at the other end of said track system said video monitor is in a stowed position.

22. A video deployment system according to claim 21, said sliding members comprising: follower rollers.

23. A video deployment system according to claim 21, said track system having a guide groove and a cam groove, said at least two guide surfaces being formed in said cam groove and said guide groove.

24. A video deployment system according to claim 21, said slide members comprising: friction members engaging at least one of said guide surfaces for exerting a predetermined frictional force such that motion of said arm is controlled.

* * * * *